Figure 1:
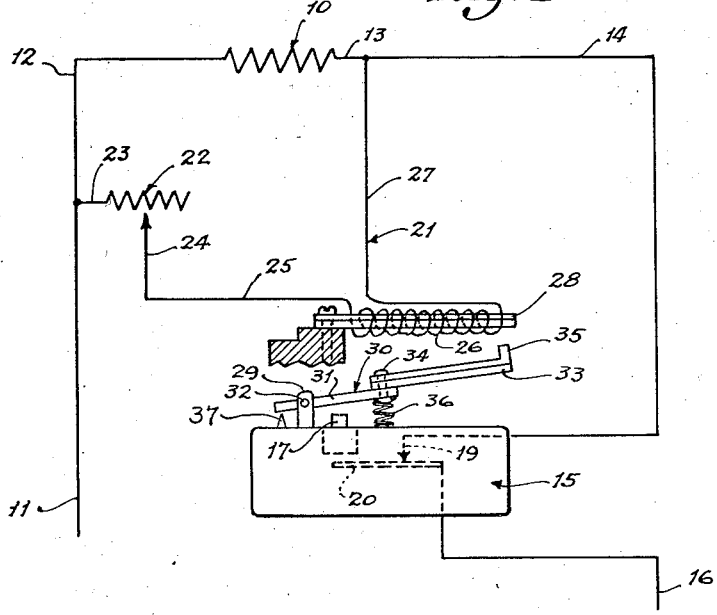

Aug. 31, 1948.

C. E. ANDERSON 2,448,289

TEMPERATURE CONTROL APPARATUS

Filed June 5, 1946

INVENTOR.
Cleophas E. Anderson
BY
Wallace and Cannon
ATTORNEYS

Patented Aug. 31, 1948

2,448,289

UNITED STATES PATENT OFFICE 2,448,289

TEMPERATURE CONTROL APPARATUS

Cleophas E. Anderson, Dubuque, Iowa, assignor to Thermo Electric Manufacturing Company, Dubuque, Iowa, a corporation of Illinois Application June 5, 1946, Serial No. 674,607

2 Claims. (Cl. 219—20)

This invention relates to temperature control apparatus and more particularly to temperature control apparatus for electrically heated units wherein control is effected by an auxiliary heating circuit which may be positioned remotely from the main heating circuit or load.

It is an object of my invention to provide temperature control apparatus especially adapted for use in conjunction with units which operate at high temperatures such as, for example, electric furnaces, but which may also be adapted for use with relatively low temperature apparatus, such as hot plates, domestic ovens, melting pots and the like.

In the usual electrically heated units heretofore known, variations in the line voltage supplied thereto resulted in variations in the temperature of the working chamber of the unit because the heating element therein when operating on various voltages emitted different quantities of heat and no control was afforded to compensate for such variation. It is an object of my invention to overcome this objection by associating a temperature control device with the primary heating unit in such a manner that variations in the line voltage effect a similar variation in the voltage of the control circuit to thereby automatically compensate for the variation in the line voltage as applied to the main heating element by either shortening or prolonging the period during which the greater or lesser amount of current, respectively, flows through the main heating element, depending upon whether the line voltage rises or lowers. Hence, it will be seen that when my apparatus is in use, if the line voltage drops, thus causing reduced current flow through the main heating element with a resultant lowering of the quantity of heat put out by the main heating element per unit of time, the control circuit will cause the reduced current to flow through the main heating element a greater proportion of the time; and if, on the other hand, the line voltage rises the control circuit will cause the increased current to flow through the main heating element a smaller proportion of the time. It will thus be seen that with this control the temperature of the working chamber, which the main heating element is employed to heat, may be kept constant within relatively narrow limits even though the line voltage may vary considerably.

It is a further object of my invention to construct a temperature control apparatus wherein a fixed main load may be used, the only adjustably variable load, associated therewith, being in the control circuit which is in parallel with the main load.

Another object of my invention is to associate a temperature control unit with a main heating element in such a manner that the control circuit may be used at a place remote from the working chamber within which the main heating element is used so that the control unit is not effected by radiated heat from the main heating element or other sources other than the heating element of the temperature control unit itself.

It is a further object of my invention to construct a control circuit which when utilized in a heating circuit draws a very small percentage of the total current demand required by the entire circuit.

Another object of my invention is to construct a temperature control unit operated by an auxiliary heating unit wherein the auxiliary heating unit and switches used in the temperature control unit device may be small and therefore are much more sensitive and quicker acting than the thermostat elements commonly used interiorly of electric furnaces, or the like, wherein the latter must be of relatively heavy construction to withstand the high temperatures to which they are subjected and are, therefore, relatively sluggish in their action.

Yet another object of my invention is to construct a temperature control operated by an auxiliary heating unit where the elements of the control unit are associated in such a manner that proper operation of the control unit is assured even though the ambient temperature may vary considerably.

Other and further objects of the present invention will be apparent from the following description and claims and are illustrated in the accompanying drawing which, by way of illustration, shows a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 2:
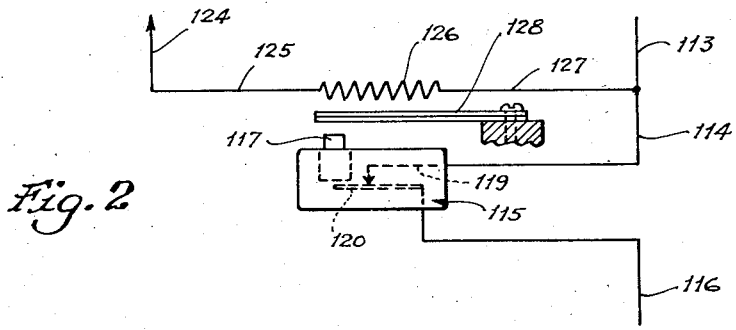

In the drawing:

Fig. 1 constitutes a diagrammatic illustration of the preferred form of my invention; and Fig. 2 constitutes a diagrammatic illustration of a modified form of my invention.

In Fig. 1 of the drawing, my novel temperature control apparatus is illustrated as embodying a main heating element 10 which may be the heating element used to heat the interior of an electric furnace, or to heat an oven, melting pot, electric grill or the like. One end of the heating element 10 is connected to a main power line 11 by means of a connecting line 12, and the other end of the main heating element 10 is connected through a line 13, a line 14, and a normally closed switch 15 to the other main power line 16. The switch 15 is preferably a snap action switch such as, for example, what is known to the trade as a microswitch, having a push button 17, a stationary contact 19 and a movable contact 20.

A control circuit 21 is connected across the power lines 11 and 16 in parallel to the main heating element 10 and comprises a variable resistance such as a rheostat 22, one end of which is connected to the power line 11 by a line 23, and the movable contact 24 of the rheostat 22 is connected through a line 25, an auxiliary heating element or control unit heating element 26 and a line 27 to the junction of the lines 13 and 14 and, thus, to the other power line 16. The control unit heating element 26 is preferably wrapped around a bimetallic element 28 and forms a heating coil therefor as will be presently explained.

The switch 15 has a bracket 29 projecting upwardly therefrom adjacent to the push-button 17, and a switch arm 30 has one end portion 31 pivotally attached to the bracket 29 by means of a pin 32. The free end portion of the switch arm 30 comprises a bi-metallic arm or element 33 one end of which is fastened to the free end of the end portion 31 by any suitable means such as a rivet 34 and the other end of which has an upstanding lug or ear 35 provided thereon. A helical spring 36 is positioned between the top wall of the switch 15 and the point of juncture between the end portion 31 and the bimetallic element 33 of the switch arm 30, and yieldingly urges the free end of the switch arm 30 upwardly. A limit stop 37 is provided on the top wall of the switch 15, adjacent to the bracket 29, and limits the rotation of the switch arm 30 in a counter-clockwise direction (Fig. 1).

The switch arm 30 underlies the bimetallic element 28 and is substantially parallel thereto, and preferably is insulated therefrom in any suitable manner such as, for example, by positioning a sheet of insulating material therebetween through which the ear 35 projects and is free to move.

The switch arm 30 also overlies the push button 17 and it is, of course, apparent that rotation of the switch arm 30 a predetermined amount in a clockwise (Fig. 1) direction will cause the push button 17 to be depressed and, therefore, the movable contact 20 to move downwardly out of engagement with the fixed contact 19.

In the operation of my device, the main heating element 10 is positioned within the working chamber of the electric furnace, or the like, which it is desired to heat and the control circuit 21 is positioned outside of the working chamber at some point where it is not subject to the heat of the working chamber. Line voltage is provided across the lines 11 and 16 and when the contacts 19 and 20 of the switch 15 are closed the current flow through the main heating element 10 is from the main power line 11 through line 12, the main heating element 10, line 13, line 14, the switch contact 19, and the switch contact 20 to the other main power line 16. Also it will be noted that when the contacts 19 and 20 of the switch 15 are closed, the current also flows from the main line 11 through the line 23, the variable resistance 22, line 25, the control unit heating element 26, line 27, line 14, contact 19 and contact 20 to the main line 16. However, it will be noted that when current flows through the control unit 21 the control unit heating element 26 is caused to be heated and thereby heats the bimetallic element 28, which, upon being heated sufficiently, is caused thereby to deflect downwardly into engagement with the lug 35 of the switch arm 30. Continued downward deflection of the heating element 28 will then cause the switch arm 30 to rotate about the pin 32 and thereby press the push button 17 down to deflect the movable contact 20 downwardly and thereby break the circuit through the main heating element 10 and the control unit 21. When the circuit is broken by the opening of the switch 15, the heating element 26 is, of course, no longer caused to be heated and, therefore, the heating element 26 and the bimetallic element 28 cool, and when the bimetallic element 28 has cooled sufficiently, it again straightens out and moves out of engagement with the switch arm 30, which, therefore rotates in a counter-clockwise direction under the urging of the spring 36. The counter-clockwise rotation of the switch arm 30 releases the push button 17 and the movable contact 20 to again close the switch 15 and reestablish the circuits through the main heating element 10 and the control device 21.

It will be apparent that although when the heating coil 26 is energized and the bi-metallic element 28 is thereby heated it is caused to deflect relative to the bi-metallic arm 33, changes in ambient temperatures adjacent the control circuit 21 causes an equal deflection of the bi-metallic element 28 and the bi-metallic arm 33 and, therefore, change in the ambient temperature does not change their relative position or affect the operation of the unit.

From the foregoing it will be seen that regulation of the heat output of the main heating element 10 is effected by controlling the proportion of the time that the heating element 10 is "on." Thus if a high temperature is desired within the working chamber of the electric furnace, or the like, it is necessary that the heating element 10 be on for a relatively great proportion of the time, and this is accomplished by adjusting the variable resistance 22 to impose a relatively great resistance in the control circuit 21 so that a relatively small current flows through the auxiliary heating element 26 and, therefore, it takes a relatively great length of time for the heating element 26 to heat the bimetallic arm 28 sufficiently to cause it to open the switch 15 as compared to the time that it takes, after the switch 15 has been opened, for the arm 28 to cool sufficiently to again permit switch 15 to close. If, on the other hand, it is desired to maintain a relatively low temperature within the working chamber of the electric furnace or the like, the variable resistance is adjusted to impose a relatively low resistance in the control circuit 21 so that the current flow through the auxiliary heating element 26 is relatively great and, therefore, each time the switch 15 is closed the heating element 26 relatively quickly heats the bimetallic arm 28 to again open the switch 28.

From the foregoing it will be noted that current intermittently flows and stops flowing through the main heating element 10 in accordance with the closing and opening, respectively, of the switch 15; and the temperature of the working chamber, which is heated by the main heating unit 10 is controlled by regulating the proportionate time that the switch 15 is closed and current flows through the main heating element 10, which regulation is accomplished by the control device 21.

Also, it will be noted that with my apparatus, it is unnecessary to put control devices in series with the main heating element 10 as was heretofore common in the art and, therefore, the main load remains relatively constant as distinguished from the widely varying loads imposed by controlled heating apparatus heretofore known to the art. All the controls that are necessary in my apparatus are incorporated in the control device, the circuit for which is in parallel with the main heating element circuit, and the load imposed thereby is relatively small, and is preferably maintained below 10% of the entire load of the whole circuit.

Also it will be noted that when once set my control unit is effective to maintain the same temperature in a working chamber, within very narrow limits, although the line voltage may vary considerably.

In addition, it will be noted that, with my apparatus, regulation of temperature within a working chamber may be effectively remotely controlled.

The modification shown in Fig. 2 embodies a somewhat different control unit which is primarily adapted for use in places where the ambient temperature which surrounds the control unit is substantially constant. Only enough of the circuit is shown to clearly illustrate how it would be embodied in a complete circuit such as that illustrated in Fig. 1 and identical elements are indicated by the same reference numerals with the prefix "1" added thereto.

The principal difference between the modification shown in Fig. 2 and the preferred form of my invention illustrated in Fig. 1 is that the switch arm 30 is eliminated in the modified form and the bi-metallic element 128 actuates the push-button 117 directly.

The auxiliary heating unit 126 may be placed adjacent to, or wound around, the bi-metallic element 128.

It will be apparent that in the operation of the modified form of my invention, when the switch elements 119 and 120 are closed current flows from one power line (not shown) through the movable contact 124, line 125, the heating unit 126, line 127, line 114, the switch 115 to the other power line 116, and upon the heating unit 126 heating the bi-metallic element 128 sufficiently, the latter is caused to deflect sufficiently to depress the push button 117 and thereby open the switch contacts 119 and 120. Opening of the switch contacts 119 and 120 breaks the circuit through the heating unit 126 as well as the main heating unit (not shown), and the bi-metallic element 128 then begins to cool and when it has cooled sufficiently it straightens out to thereby release the push-button 117 and permit the contacts 119 and 120 to again close and re-establish the circuits through the control heating unit 126 and the main heating unit (not shown).

It will be noted that the modified form of my invention may be economically constructed and is especially well adapted for use in places where the ambient temperatures around it are substantially constant.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. Temperature control apparatus for an electric furnace or the like and comprising in combination, an electrical heating element, a switch connected in series with said electrical heating element, a bi-metallic arm pivotally mounted on said switch and operable upon rotation in one direction to open said switch, a bi-metallic element adjacent to and substantially parallel to said bi-metallic arm, a second electrical heating element wrapped around said bi-metallic element in heat exchange relationship thereto, a variable resistance, said resistance and said second heating element being connected in series with each other and with said switch, and being connected in parallel with said first mentioned electrical heating element, said bi-metallic element being adapted to be deflected into operative engagement with said bi-metallic arm and to rotate said arm in said one direction to thereby open said switch upon application of a sufficient quantity of heat to said bi-metallic element by said second heating element.

2. Temperature control apparatus comprising an electrical heating element, a switch connected in series with said electrical heating element, a bi-metallic arm mounted on said switch and operable upon the application of a predetermined pressure thereon in one direction to open said switch, a bi-metallic element normally positioned adjacent to and substantially parallel to said bi-metallic arm, a second electrical heating element wrapped around said bi-metallic element in heat exchange relationship thereto, a variable resistance, said resistance and said second heating element being connected in series with each other and with said switch, and being connected in parallel with said first-mentioned electrical heating element, said bi-metallic element being adapted to be deflected into operative engagement with said bi-metallic arm and to press against said arm with said predetermined pressure in said one direction to thereby open said switch upon the application of a sufficient quantity of heat to said bi-metallic element by said second heating element.

CLEOPHAS E. ANDERSON.

REFERENCES CITED

The following references are of record in the file of this patent:

UNITED STATES PATENTS

| Number | Name | Date |
| --- | --- | --- |
| 1,873,421 | Kanter | Aug. 23, 1932 |
| 1,908,676 | Appelberg | May 16, 1933 |
| 2,009,601 | Anderson | July 30, 1935 |
| 2,125,110 | Harty | July 26, 1938 |
| 2,196,380 | Biebel | Apr. 9, 1940 |
| 2,400,735 | Bradford | May 21, 1946 |

FOREIGN PATENTS

| Number | Country | Date |
| --- | --- | --- |
| 221,480 | Great Britain | Feb. 19, 1925 |